United States Patent [19]

Barlow

[11] Patent Number: 5,441,825

[45] Date of Patent: Aug. 15, 1995

[54] BATTERY ELECTRODE COMPRESSION MECHANISM

[75] Inventor: Geoffrey Barlow, South Russell, Ohio

[73] Assignee: Westinghouse Electric Corporation, Pittsburgh, Pa.

[21] Appl. No.: 185,357

[22] Filed: Jan. 24, 1994

[51] Int. Cl.6 .................................. H01M 2/10
[52] U.S. Cl. ................................ 429/66; 429/181
[58] Field of Search ............ H01M 2/10; 429/66, 181

[56] References Cited

U.S. PATENT DOCUMENTS

| | | | |
|---|---|---|---|
| 4,071,663 | 1/1938 | Bredbenner | 429/181 |
| 4,419,418 | 12/1983 | Knodler et al. | 429/181 X |
| 4,508,797 | 4/1985 | Knoedler et al. | 429/181 X |
| 4,898,795 | 2/1990 | Stocchiero | 429/66 |

FOREIGN PATENT DOCUMENTS 55-133761  10/1980  Japan .................................. 429/66

OTHER PUBLICATIONS

*Patent Abstracts of Japan*, vol. 13, No. 518, p. 5 (E-848) (for Kokai 01-209671) Takahashi, Aug. 1989.
*Patent Abstracts of Japan*, vol. 17, No. 398, p. 7 (E-1403) (For Kokai 05-74473) Akiyama, Mar. 1993.

*Primary Examiner*—Stephen Kalafut

[57] ABSTRACT

A device for compressing the cell stack disposed within the battery case of a multicell battery and providing a gas-tight, electrically isolated seal for one of the battery terminals. The device comprising an expandable unit disposed between the cell stack and a surface of the battery case. The unit having a cavity disposed therein and a sealable port through which a pressurized fluid may be provided to the cavity thereby expanding the unit. The unit is preferably comprised of two concentric annular metal bellows.

16 Claims, 4 Drawing Sheets

BATTERY ELECTRODE COMPRESSION MECHANISM

BACKGROUND OF THE INVENTION

1. Field of the Invention

This invention relates to improvements in stacked multicell batteries, and more particularly to preventing unwanted ionically conductive paths from forming between adjacent cells and the battery case.

2. Description of the Prior Art

When constructing practical electrochemical cells in batteries there are two basic ways in which electrodes can be connected inside the cell or battery module case. These are series and parallel connections. In a bipolar battery design, the electrodes are hooked together in series, thus the voltage of the stack is n times that of a single cell, where n is equal to the number of cells in the stack. Each cell comprises a positive and a negative electrode physically separated from one another by an ionic conductor.

The positive electrode, negative electrode and separator of each cell contains an electrolyte which is liquid at the operating temperature. The bipolar wall separates adjacent cells and is designed to allow an electronic path between adjacent cells while not allowing an ionic path. Positive and negative current collecting plates are typically provided at opposite ends of the cell stack.

It is well known in the battery industry that when porous, high surface area electrodes in an electrochemical cell or battery are charged or discharged they undergo volume changes due to the formation of different chemical species as a result of the oxidation and reduction reactions. If maximum performance is to be realized from an operating battery over an extended period of time, good electrical contact must be maintained at all times between the electrodes and current collection system, in spite of the electrode volume changes. The good electrical contact is achieved in principle by applying sufficient uniform pressure to the electrode/current collector assembly. In ambient temperature batteries, the pressure is usually achieved by stuffing the electrode/current collector assembly into a rigid cell case before adding the liquid electrolyte. The addition (or stuffing) of the electrolyte typically causes some swelling of the electrodes and hence a uniform pressure is established on the electrode/current collector assembly.

Unfortunately this stuffing technique cannot be readily applied to high temperature molten salt electrolyte batteries in which the electrolyte is incorporated into the powder electrodes and separator during their manufacture. Consequently, a more elaborate technique is necessary to apply this uniform pressure and maintain it at temperatures in the range of 400° to 500° C. (depending on the melting point of the alkali-halide electrolyte chosen).

An additional problem that develops with lithium alloy/metal sulfide high temperature molten salt electrolyte batteries is that due to the nature of the very reactive and highly hygroscopic lithium compounds they contain, the cells/batteries must be well sealed from the outside air (i.e., oxygen and moisture) to prevent any undesirable reactions and, hence, loss in cell/battery performance. The difficult problem in affecting a sealed cell/battery is that the seal must also function to electrically isolate one of the cell/battery terminals from the other terminal of opposite polarity.

SUMMARY OF THE INVENTION

I provide a device for compressing the cell stack of a multicell battery. The compression device is disposed within the battery case (housing). The device being expandable and being disposed between the cell stack and a surface of the battery case. The device having a cavity disposed therein and a sealable port through which a pressurized fluid may be provided to the cavity thereby expanding the device.

The device is preferably comprised of two annular bellows which are concentrically disposed about a vertical axis of the cell stack. One face of each bellows is preferably connected to a rigid surface of the battery case, and an opposite face of each bellows is preferably connected to the cell stack. The bellows are preferably connected to the cell stack by contacting a rigid bellows plate which lies upon a sheet of insulation disposed between the rigid bellows plate and a current collector plate. The current collector plate lies directly adjacent the cell stack.

An elongated battery terminal is preferably disposed about a center axis of the cell stack in the concentric bellows. The battery terminal is preferably connected directly to the current collector plate. Thus, the battery case, the rigid bellows plate and the sheet of electrical insulation preferably have respective holes provided therethrough through which the battery terminal is provided.

The battery terminal is preferably electrically isolated from electrical contact with the battery casing or the compression device by means of a terminal seal provided around the battery terminal. The terminal seal is provided around the battery terminal between the battery terminal and the bellows having the smallest diameter.

Other objects and advantages of the invention will become apparent from a description of certain present preferred embodiments thereof shown in the drawings.

DETAILED DESCRIPTION OF THE PREFERRED EMBODIMENT

Figure 1:
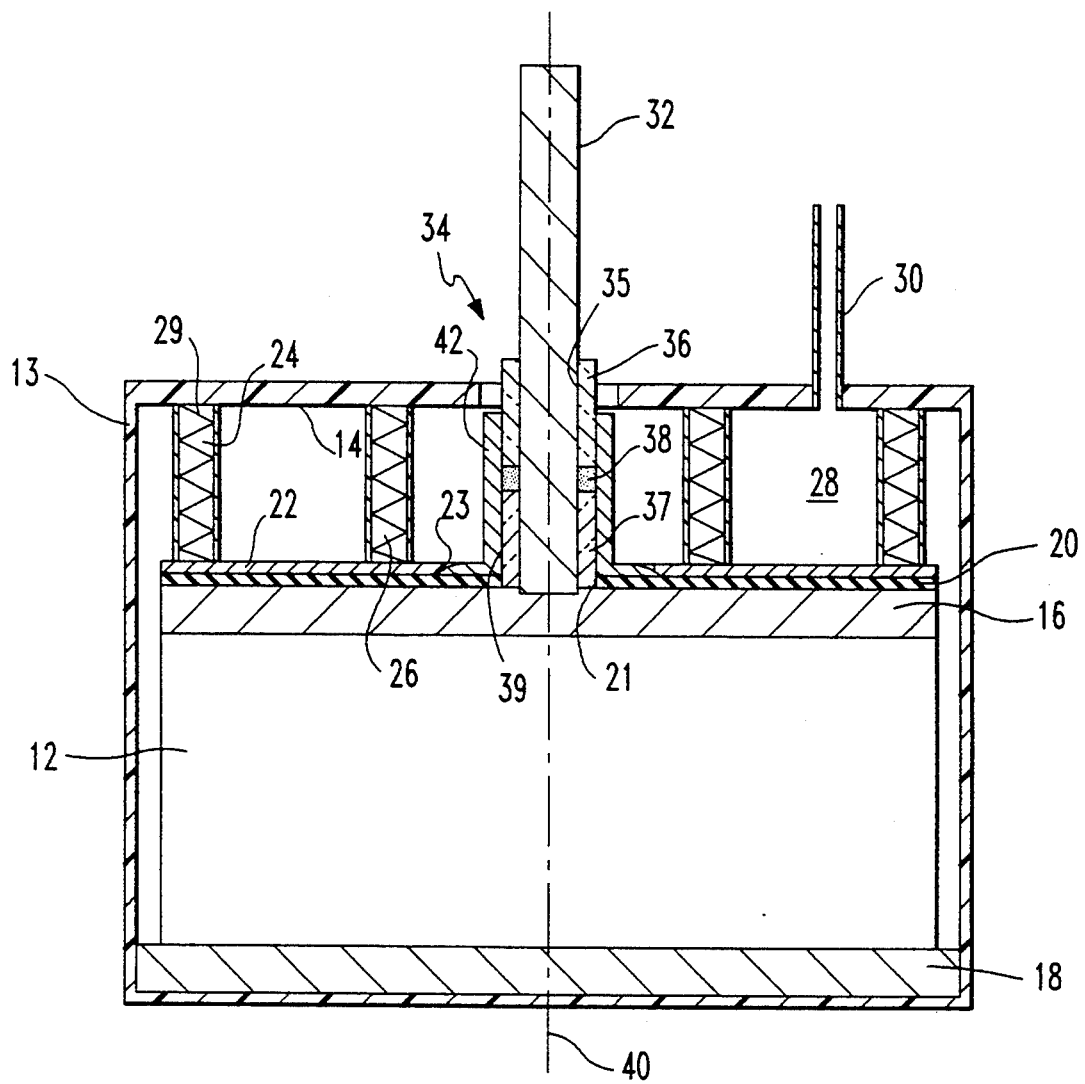
FIG. 1 is a cross sectional view taken in elevation of a battery incorporating the preferred compression mechanism.

Referring to the figures, a mechanism is shown that may apply a compressive force to the cell stack 12 of a multicell battery. As can be seen best in FIG. 1, a battery case or housing 13 contains the cell stack 12 and the positive and negative current collectors 16, 18 which are provided on opposed end of the cell stack 12. The positive current collector 16, in the embodiment shown in the figure, is provided on the upper end of the cell stack 12. A feedthrough 32 which is a positive battery terminal, is connected to the positive current collector and extends out of the battery case 13. It is understood that the battery may also be configured so that the negative current collector is positioned on top of the cell stack.

Figure 2:
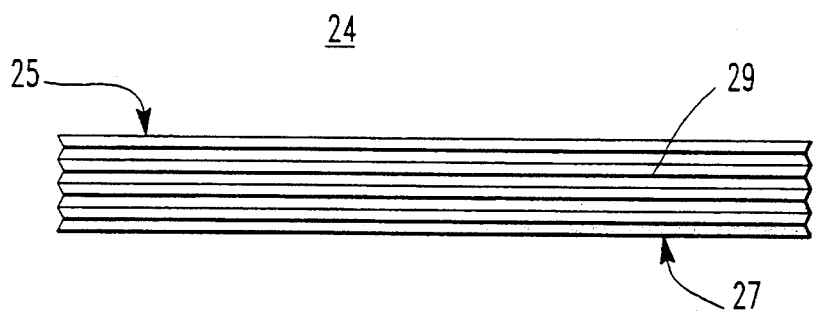
FIG. 2 is a front elevation view of a bellows for use in the preferred compression mechanism.

The compression device preferably is utilized in cooperation with an isolated feedthrough seal 34 that is described more fully below. The preferred compression device comprises a first and a second stainless steel, generally annular bellows 24, 26. Each of the bellows 24, 26 are a creased or pleated annular member. As can be seen in FIG. 2, each bellows has an upper annular face 25 and a lower annular face 27. Each bellows further have creases or pleats 29 which extend parallel to the upper and lower faces 25, 27. Although bellows 24 is depicted in FIG. 2, it is understood that each bellows is similarly configured. The pleats 29 of the bellows 24, 26 may act as hinges so that the bellows may be compressed or extended by the closing or opening of the pleats, respectively. In this way, the bellows may move in a direction perpendicular to the planes of the upper and lower faces 25, 27.

There are a number of manufacturers of suitable metal bellows, however, the preferred metal bellows are manufactured by John Crane Belfab Division of Daytona Beach, Fla. Being fabricated of stainless steel components, the preferred compression device is well able to operate for extensive periods at 400° to 500° C. Thus, the compression device is able to withstand the high operating temperatures associated with molten salt electrolyte batteries. The preferred bellows material is stainless steel due to its ability to operate at high temperatures, to flex sufficiently to extend and compress and to retain a seal. It is understood that any material capable of providing these characteristics, such as other metals and alloys, may be employed as the bellows material.

Figure 3:
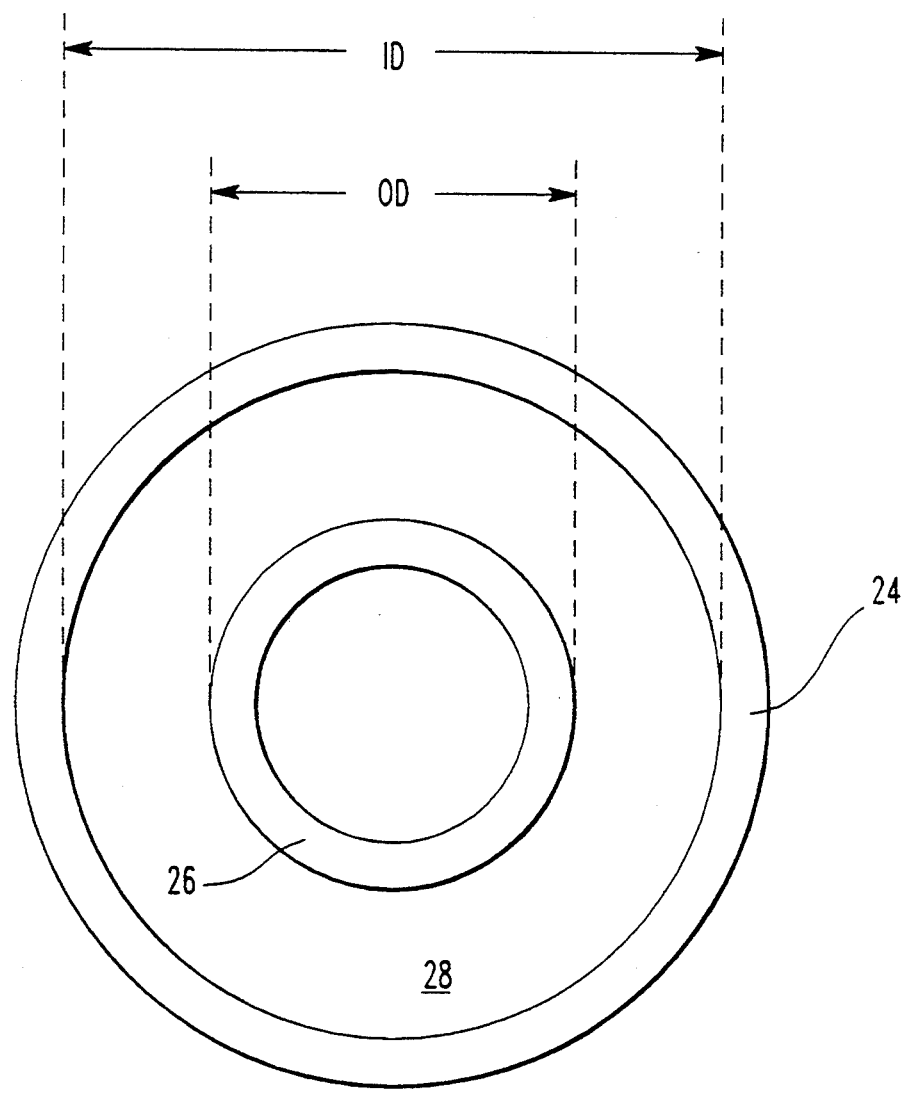
FIG. 3 is a top plan view of two annular bellows of the preferred composition device positioned concentrically.

As can be seen best in FIG. 3, the first and second bellows 24, 26, being annular, have an inner diameter (designated as ID in the figure) and an outer diameter (designated as OD in the figure). The bellows 24, 26 are arranged so that the first bellows 24 surrounds the second bellows 26. Therefore, the inner diameter of bellows 24 is greater than the outer diameter of bellows 26. The bellows 24, 26 are preferably arranged in a concentric manner so that an annular cavity 28 is provided between the bellows. The bellows are preferably arranged concentrically around a vertical axis of the cell stack, preferably the center axis (shown as a dotted line 40 in FIG. 1). However, it is understood that the bellows 24, 26 need not be arranged perfectly concentrically so that cavity 28 need not be perfectly annular.

The bellows 24, 26 each have an upper face 25 and a lower face 27. The two bellows 24, 26 are affixed (preferably welded) at their respective upper and lower faces 25, 27 to rigid, preferably metal surfaces. The respective upper faces 25 of the bellows 24, 26 are attached to a rigid surface 14 which forms one end of the cell/battery case 13. The respective lower faces 27 of the bellows 24, 26 are preferably attached to a rigid plate 22 which presses against the cell stack 12. The bellows 24, 26 are affixed to the opposed rigid surfaces 14, 22 in an airtight manner. It is further preferred that a sheet of electrically insulating material 20 be provided between the rigid bellows plate 22 and the upper surface of the positive current collector 16.

A structure is thereby formed comprising two annular bellows 24, 26. The two bellows 24, 26 being affixed at the upper faces 25 and lower faces 27 thereof to rigid battery case surface 14 and bellows plate 22, respectively. An annular space or cavity 28 is thus provided which is bounded by bellows 24, bellows 26, rigid surface 14 and bellows plate 22. A conduit or port 30 through the battery case 13 provides a path to and from the annular cavity 28 so that a pressurized fluid (preferably a gas) may be introduced into the cavity 28 between the bellows 24, 26. Thus, the compression device forms a completely contained space except for the port 30.

Figure 4A:
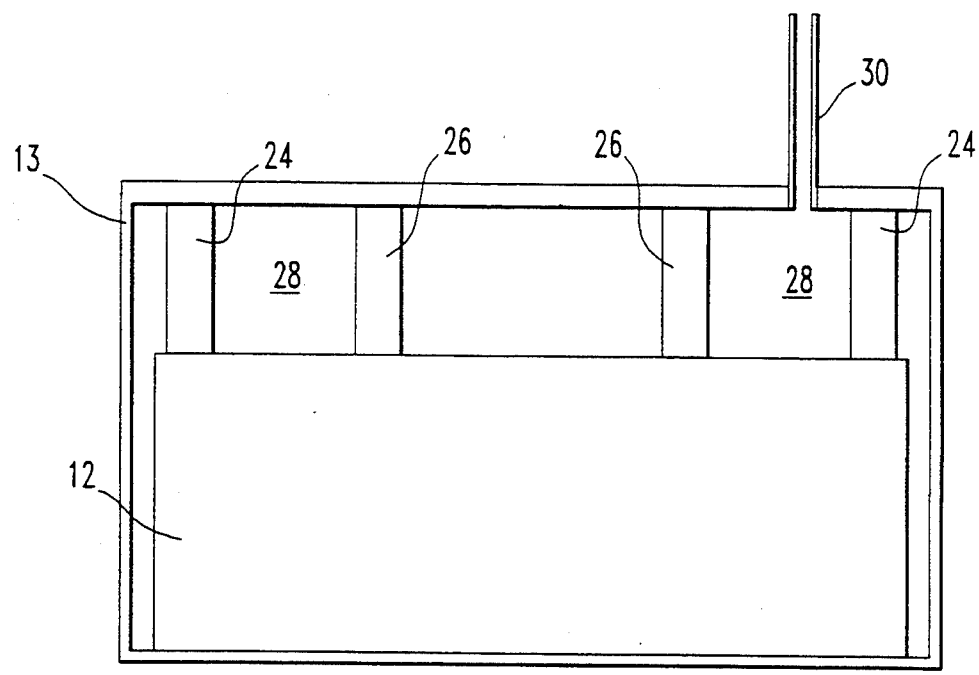
FIG. 4A is a schematic representation of the preferred compression device in an unexpanded position.
Figure 4B:
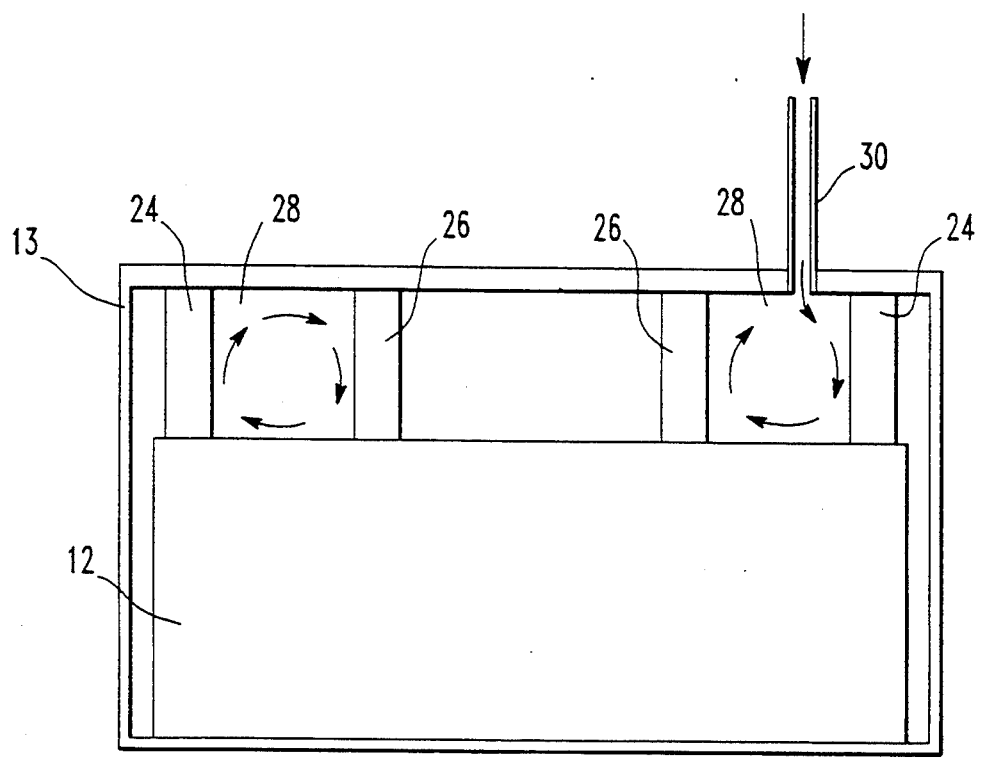
FIG. 4B is a schematic representation of the preferred compression device in an expanded position.

By applying a controlled fluid pressure in the annular cavity 28 between the two bellows, it is possible to apply the correct amount of compression on the cell electrodes. The preferred fluid is a gas, such as argon. Other nonoxidizing gases such as nitrogen are also preferred. With the reference to FIGS. 1, 4A and 4B, the preferred compression device operates as follows. A pressurized gas (depicted by the arrows in FIG. 4B) is introduced into the annular cavity through port 30. The pressurized gas causes the bellows 24, 26 to expand and extend so that the pleats 29 which had been folded, open somewhat. The upper faces 25 and lower faces 27 of the bellows 24, 26 are then moved away from one another. Because the upper faces 25 of each bellows 24, 26 are affixed to the battery case 13, the upper faces 25 of the bellows 24, 26 will not move relative to the battery case 13. Therefore, the respective lower faces 27 of the bellows 24, 26 will move away from the upper faces 25 of the bellows 24, 26. The rigid bellows plate 22, being connected to the lower faces 27 of the bellows, will also be moved away from the upper faces 25 of the bellows. Thus, the rigid bellows plate 22 will press against or apply a compressive force to the cell stack 12. This compressive force is transmitted through the positive current collector 16 and the sheet of electrical insulation 20 which are preferably located directly adjacent to the cell stack 12.

An electrically isolated feedthrough battery terminal post 32 is preferably provided at the center axis of the cell stack and the concentric bellows 24, 26. The center battery terminal post 32 is connected directly to the metal positive current collector plate 16. Thus, the rigid bellows plate 22 preferably has a hole 23 placed therethrough, through which the battery terminal 32 is disposed. Similarly, the sheet of electrical insulation 20 has a hole 21 provided therethrough, through which the battery terminal 32 is provided. Also, the battery case 13 has a hole provided therethrough through which the battery terminal 32 may extend. The purpose of locating the isolated battery terminal 32 on the center axis of the two bellows 24, 26 is that the battery terminal 32 occupies volume that would otherwise be unused in the battery and thus enhances the battery volumetric energy density. It is understood, however, that the feedthrough battery terminal post 32 may be provided along any vertical axis of the cell stack. Wherever the feedthrough post is located, the bellows will preferably be provided around it.

The battery terminal post 32 is electrically isolated in that it contacts the current collector but makes no electrical contact with the battery casing or the compression device. The battery terminal post 32 is electrically isolated by means of a terminal seal 34. The terminal seal 34 is provided around the battery terminal 32 between the battery terminal post 32 and the bellows having the smallest diameter.

Figure 5:
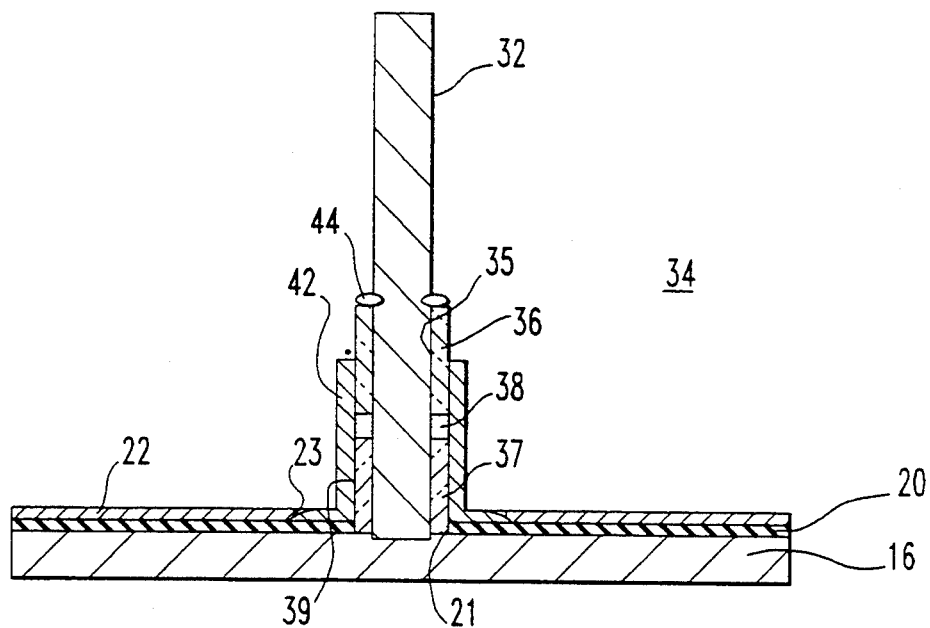
FIG. 5 is a cross sectional view taken in elevation of a first preferred terminal seal for use with the compression device.

A first preferred terminal seal 34 can be seen in FIG. 5. The insulating properties of the seal 34 are achieved by the use of upper and lower rings (bushings) 36, 37 constructed of insulating material, which are captured in a terminal housing 42. The bushings 36, 37 are preferably constructed of a ceramic material. The upper and lower bushings 36, 37 are provided around the battery terminal 32 and are separated from one another by a selected vertical difference. Each bushing 36, 37 has an inner surface 35 and an outer surface 39. The bushings 36, 37 are placed around the battery terminal 32 such that the inner surface 35 of both the upper and lower bushings 36, 37 contact and are preferably affixed to the battery terminal 32.

A hollow, sleeve-like terminal housing 42 is connected at one end to the bellows plate 22. The terminal housing 42 then extends upward from the bellows plate 22 and surrounds the bushings 36, 37. The terminal housing 42 is preferably in close contact with the outer surfaces 39 of the bushings 36, 37. The terminal housing 42, which is preferably of metal construction, may be affixed to the bushing outer surfaces 39 such as by being brazed thereto. Thus, an area is formed that is bordered by the battery terminal 32, the two bushings 36, 37 and the terminal housing 42. A bed of boron nitride powder 38 is preferably packed within the area bordered by the battery terminal 32, the two bushings 36, 37 and the terminal housing 42.

The seal 34, comprised of two vertically-spaced ceramic bushings 36, 37 contained by a housing 42 having packed boron nitride powder 38 placed therebetween, is secured to the metal battery terminal post 32. The bushings 36, 37 and boron nitride powder 38 may be secured to the battery terminal 32 by being brazed thereto. They may also be secured to the battery terminal 32 by having a clip 44 secured snugly around the battery terminal post 32 adjacent the upper ceramic bushing 36. Thus, since the seal 34 is connected to both the battery terminal 32 and to the bellows plate 22, as the cell stack and current collector moves, the battery terminal post 32 and seal 34 move as well.

Figure 6:
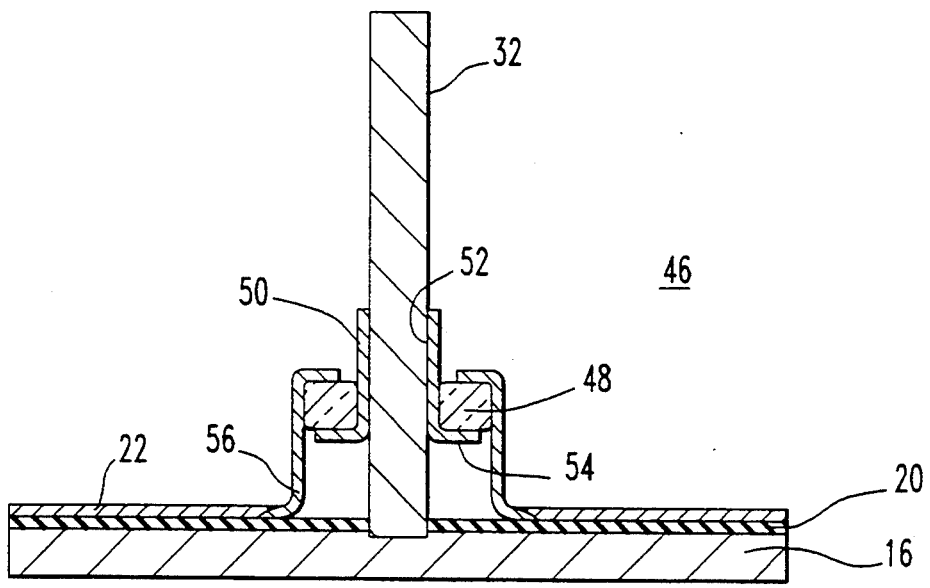
FIG. 6 is a cross sectional view taken in elevation of a second preferred terminal seal for use with the compression device.

A second preferred seal 46 is shown in FIG. 6. Seal 46 utilizes a hollow, sleeve-like terminal housing 50 which is provided around the feedthrough battery terminal 32. The terminal housing 50 has a contact portion 52 and a support portion 54. The contact portion 52 of the terminal housing lies flat against and contacts the feedthrough battery terminal 32. The support portion 54 of the terminal housing extends out away from the battery terminal 32 at some selected angle, preferably perpendicular to the battery terminal 32. A bushing 48 made of an insulating material is then provided around the battery terminal 32 and around the contact portion 52 of the terminal housing. The bushing 48 is preferably made of a ceramic material. The bushing 48 lies in contact with the support portion 54 of the terminal housing 50 being secured to the terminal housing 50.

The preferred terminal housing 50 is of metal construction. Thus, the contact portion 52 of the terminal housing 50 may be welded to the metal battery terminal 32. Furthermore, the terminal housing 50 may be brazed to the ceramic bushing 48. The ceramic bushing 48 is preferably brazed to at least one of the contact portion 52 and the support portion 54 of the terminal housing 50. An anchor housing 56 is preferably placed around the battery terminal 32 and around the ceramic bushing 48. The anchor housing 56 is connected at one end to the rigid bellows plate 22 and is secured at an opposite end to the ceramic bushing 48. The anchor housing 56 is preferably of metal construction and is thus preferably secured to ceramic bushing 48 by being brazed thereto. The anchor housing 56 is preferably welded to the bellows plate 22.

Variations of the preferred embodiments may be made. For example, although it is preferred that two bellows be utilized in the compression device, any number of bellows forming any number of cavities may be provided.

Also, although it is preferred that the bellows be annular, they may have any shape, such as oval, square, rectangular, polygonal or irregular. However, despite which shape or shapes are selected for the bellows, one bellows will have a greater width (or diameter) than an adjacent bellows. Because one bellows has a greater width than an adjacent bellows, the bellows will surround the adjacent bellows, creating a cavity therebetween.

The above-described compression mechanism has been described in connection with high operating temperature batteries. However, it is understood that the compression mechanism may be employed in batteries that operate at lower temperatures such as at room temperature. In such batteries, the bellows may be made of a wider range of materials as heat resistance would no longer be a design requirement. A possible bellows material in room temperature batteries would be plastic.

While certain present preferred embodiments have been shown and described, it is distinctly understood that the invention is not limited thereto but may be otherwise embodied within the scope of the following claims.

I claim:
1. A multicell battery comprising:
    a battery case;
    a cell stack disposed within the battery case; and
    a device for compressing the cell stack, the device being expandable and being disposed between the cell stack and a surface of the battery case, the device having a cavity disposed therein and a sealable port through which a pressurized fluid may be provided to the cavity thereby expanding the device, wherein the device has at least two bellows of different widths such that one bellows surrounds an adjacent bellows, one face of each bellows being connected to the cell stack and the opposite face of each bellows being connected to the battery case, so that a cavity lies between adjacent bellows and between the cell stack and the battery case.
2. The device of claim 1 wherein the bellows are annular such that an annular cavity is formed therebetween.
3. The device of claim 1 wherein the pressurized fluid is a gas.
4. A multicell battery comprising:
    a battery case;
    a cell stack disposed within the battery case; and
    a device for compressing the cell stack, the device having at least two bellows disposed within the battery case about a vertical axis of the cell stack, adjacent bellows having different widths such that one bellows surrounds an adjacent bellows forming a cavity therebetween, each bellows being extend- able and retractable in a direction parallel to the vertical axis, each bellows further having a first face and a second face and being disposed between the cell stack and a surface of the battery case such that the first face of each bellows are sealably connected to the cell stack and the second face of each bellows are sealably connected to the battery case; and a sealable port for introducing a pressurized gas into the annular cavity.

5. The device of claim 4 wherein the bellows are disposed about the center axis of the cell stack.

6. The device of claim 4 wherein the bellows are annular in shape and the cavity formed between adjacent bellows is annular in shape.

7. A multicell battery comprising:
a battery case;
a cell stack disposed within the battery case; and
a device for compressing the cell stack, the device having a first and second annular bellows being concentrically disposed about a vertical axis of the cell stack, each bellows having a selected inner and outer diameter such that the inner diameter of the first bellows is greater than the outer diameter of the second bellows forming an annular cavity therebetween, each bellows being extendable and retractable in a direction parallel to the vertical axis, each bellows further having a first face and a second face and being disposed between the cell stack and a surface of the battery case such that the first face of each bellows are sealably connected to the cell stack and the second face of each bellows are sealably connected to the battery case; and a sealable port for introducing a pressurized gas into the annular cavity.

8. The device of claim 7 wherein a current collector plate is placed adjacent the cell stack such that the first face of each bellows are connected to the current collector plate.

9. The device of claim 8 wherein the first face of each bellows is connected to the cell stack by welding a rigid bellows plate to the first face of each bellows and connecting the bellows plate to the current collector plate.

10. The device of claim 9 further comprising a section of electrical insulation disposed between the bellows plate and the current collector plate.

11. The device of claim 7 wherein the bellows are made of stainless steel.

12. The device of claim 9 further comprising an elongated battery terminal being disposed about the vertical axis of the cell stack and being connected to the current collector atop the cell stack, the battery terminal being disposed through a hole in the bellows plate, the bellows plate hole being located on a portion of the bellows plate exterior to the annular bellows cavity.

13. The device of claim 12 further comprising a seal placed around the battery terminal, the seal comprising:
(a) an upper sleeve-like insulative bushing having an inner surface and an outer surface, the upper bushing being disposed around the battery terminal, wherein the upper bushing inner surface contacts the battery terminal;
(b) a lower sleeve-like insulative bushing having an inner surface and an outer surface, the lower bushing being disposed around the battery terminal, wherein the lower bushing inner surface contacts the battery terminal, the upper bushing and the lower bushing being separated by a selected vertical distance;
(c) a sleeve-like terminal housing connected at one end to the bellows plate, the terminal housing surrounding the upper and lower bushings such that the terminal housing contacts at least some portion of the outer surfaces of the upper and lower bushings; and
(d) a layer of boron nitride powder packed adjacent the battery terminal, wherein the boron nitride powder is surrounded by and contained in contact between the battery terminal, the terminal housing, the upper bushing and the lower bushing.

14. The device of claim 13 wherein the bushings are constructed of ceramic material.

15. The device of claim 12 further comprising a seal placed around the battery terminal, the seal comprising:
(a) a sleeve-like terminal housing provided around the battery terminal, a contact portion of the terminal housing being secured to the battery terminal, and a support portion of the terminal housing extending outward away from the battery terminal;
(b) an insulative bushing provided around the battery terminal and the terminal housing contact portion, the bushing being affixed to the terminal housing support portion; and
(c) a sleeve-like anchor housing provided around the battery terminal and the bushing, the anchor housing being affixed at one end to the bellows plate, and at an opposite end to the bushing.

16. The device of claim 15 wherein the bushing is constructed of ceramic material.

* * * * *